April 17, 1928.

J. M. WHITE

WIRE STRIPPING MACHINE

Filed Aug. 6, 1927

WITNESSES:

INVENTOR:
Jessee Mercer White,

BY
ATTORNEY.

April 17, 1928.

J. M. WHITE

WIRE STRIPPING MACHINE

Filed Aug. 6, 1927

WITNESSES:

INVENTOR:
Jessee Mercer White,

BY
ATTORNEY.

April 17, 1928.  
J. M. WHITE  
WIRE STRIPPING MACHINE  
Filed Aug. 6, 1927

WITNESSES:  
Alfred E. Ischinger.  
Wesley Merrill

INVENTOR:  
Jessee Mercer White,  
BY Joshua R.H. Potts  
ATTORNEY

Patented Apr. 17, 1928.

1,666,277

UNITED STATES PATENT OFFICE.

JESSEE MERCER WHITE, OF PHILADELPHIA, PENNSYLVANIA.

WIRE-STRIPPING MACHINE.

Application filed August 6, 1927. Serial No. 211,048.

My invention relates to mechanism for stripping the insulation from the ends of insulated wires, and has for its principal object to provide a compact and dependable machine for this purpose.

In wiring a great many of the electrical appliances in use at the present time, it is necessary to remove the insulation from the ends of the electrical conductors and this operation is largely performed by hand, resulting in non-uniform stripped portions on the wires, and in scoring the electrical conductors so that they are liable to break when in use.

Another object of my invention is to provide a machine which will strip a predetermined length of insulation from the ends of electrical conductors without injury to the conductor and which may be operated by an unskilled person.

Still another object of my invention is to provide such a machine having few working parts, which will occupy but a small amount of space on a work bench, and which is so simply and sturdily built that there is little likelihood of it needing repairs.

These objects, and other advantageous ends which will appear hereinafter, I attain in the following manner, reference being had to the accompanying drawings in which Figure 1 is a top plan view of a wire stripping machine embodying my invention and showing a fragment of wire in position to be stripped, and Figure 2 a sectional plan view thereof, taken on line 2—2 on Figure 3, but showing the operating parts in position to receive a wire and having a certain part broken away.

Figure 1:
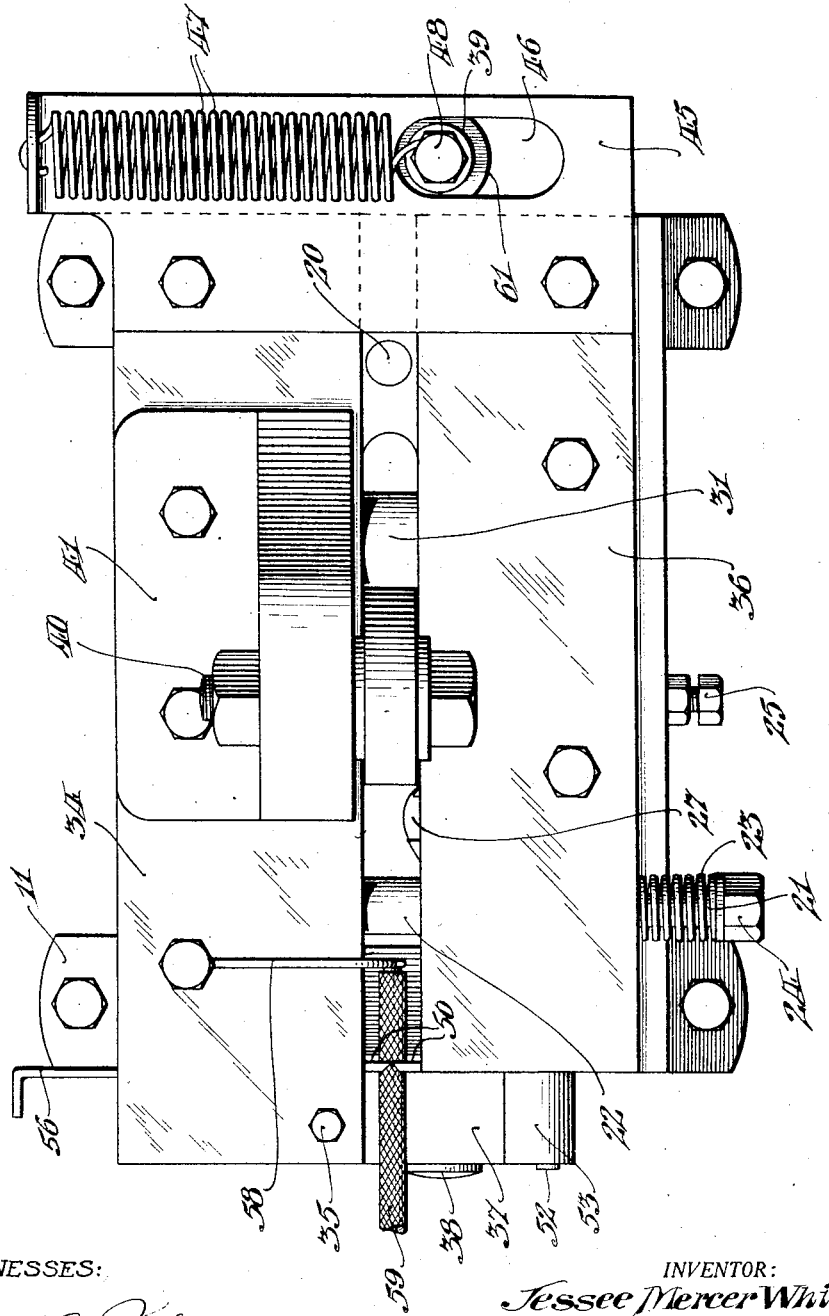

Referring now more in detail to the drawings, the machine is shown provided with a base 10 on which legs 11 are formed and provided with suitable holes through which bolts or lag screws may be passed for securing the machine to a work bench or other support 12.

A shoulder 13, having parallel sides, extends the entire length of one side of base 10 and a shoulder 14, whose inner side has a tapered portion extending the greater part of its length, is disposed along the opposite side of the base but does not extend the entire length thereof. The tops of shoulders 13 and 14 are preferably machined so as to be in the same horizontal plane and the inner faces of the shoulders and the remaining portion of the upper side of base 10, which lies in front of shoulder 14 and between shoulders 13 and 14 and designated as surface 15, should be machined in order to provide smooth surfaces against which working parts may slide.

Figure 5:
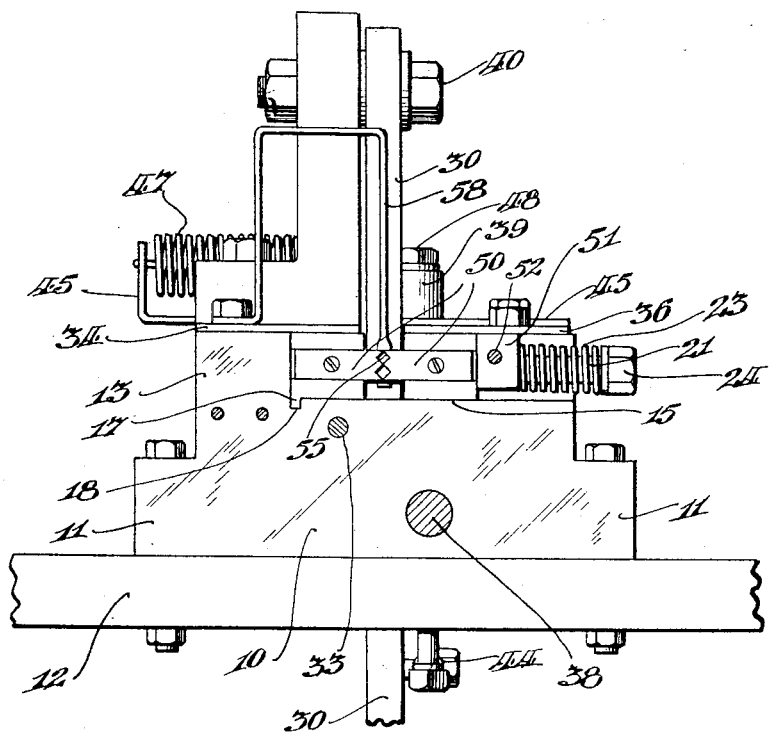
Figure 5 is a front view, somewhat similar to Figure 4, from which the gripping jaws, wire guide and the fragment of wire have been omitted, and Figure 6 an enlarged fragmentary view of the stripping jaws.
Figure 6:
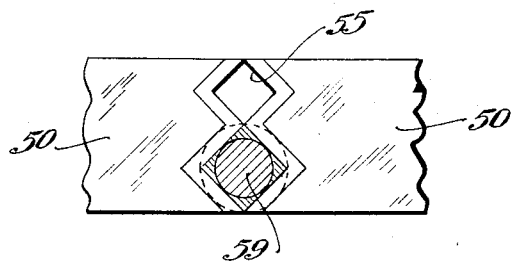

A slide 16, which is somewhat longer than base 10, is slidably mounted on surface 15 against the inner face of shoulder 13 and has a guide 17 formed on its under side and slidably mounted in a groove 18 formed in surface 15, as shown in Figure 5, so that slide 16 may freely move longitudinally of base 10 but is held against transverse movement by guide 17. A bar 19 is hingedly connected to slide 16 by means of a pin 20 and slidably mounted on surface 15 so that, when slide 16 moves longitudinally of base 10, bar 19 must move with it; the tops of slide 16 and bar 19 being disposed but slightly below the tops of shoulders 13 and 14. A bolt 21, extending freely through an aperture in bar 19 and threaded into slide 16 is encircled by a separator 22 between bar 19 and slide 16 which holds them in spaced relation to one another when bar 19 is moved toward slide 16 by the action of a spring 23 encircling bolt 21 between bar 19 and the head 24 of the bolt. The front end of bar 19 is adapted to be swung away from separator 22, as will hereinafter be described, and the longitudinally tapered portion of shoulder 14 limits its extreme outward movement while the rear end of bar 19 slidably engages the straight portion of the inner face of shoulder 14. Outward movement of bar 19 is further limited by a stop bolt 25, threaded through shoulder 14 and locked in selected positions by an ordinary jam nut, whose end is adapted to engage the inner side of a groove 26 formed in the side of bar 19, as plainly shown in Figure 2.

A roller 27, housed in a recess 28 sunk in bar 19 and having its axle 27ª rotatably mounted in a slot 29 intersecting recess 28, is adapted to be engaged by an operating lever 30, for swinging bar 19, and a roller 31, rotatably mounted between slide 16 and bar 19 by having its axle mounted in bores therein, is adapted to be engaged by operating lever 30 for sliding bar 19 and slide 16 longitudinally of base 10. Forward movement of slide 16 is limited by its front end abutting a gripping jaw 32 which is secured to the front of base 10 by a bolt 33 threaded therein.

A cover plate 34 is bolted to the top of shoulder 13 and extends from its rear end to the forward side of jaw 32 and is of a width equal substantially to the combined widths of shoulder 13 and slide 16. A bolt 35 extends through cover plate 34 and is threaded into the top of jaw 32 for assisting bolt 33 in holding the jaw against movement in any direction. A cover plate 36 is bolted to the top of shoulder 14 and is of the same length as base 10; the distance between cover plates 34 and 36 being substantially equal to the thickness of separator 22. A movable gripping jaw 37, adapted to co-act with jaw 32, is fixed on the forward end of a shaft 38, rockably mounted in base 10, and is adapted to be oscillated by a spindle 39 fixed on the rear end of the shaft, as will be hereinafter described.

Operating lever 30 is swingably mounted on a turned bolt 40 fixed in the upper part of a bracket 41 secured on cover plate 34 by suitable bolts passing therethrough and threaded into base 10. Lever 30 extends downwardly between cover plates 34 and 36, between slide 16 and bar 19, through a slot 42 formed in base 10, and terminates in a foot treadle 43. Lever 30 is yieldingly held in its forwardmost position by a spring 44 which has its ends secured, respectively, to lever 30 and to support 12. A plate 45, superimposed on cover plates 34 and 36 and bolted to the rear part of base 10, is provided with a slot 46 through which spindle 39 extends. A spring 47 has one end secured to an upturned end of plate 45 and its other end secured to the top of spindle 39 in any suitable manner, as by means of a bolt 48 threaded into the top of the spindle, and, as spindle 39 and jaw 37 are both fixed to shaft 38, tends to hold jaw 37 in contact with jaw 32.

When lever 30 is in its forwardmost position, a beveled portion 49 will engage roller 27 and force bar 19 away from separator 22 and cause the stripping jaws 50, which are adjustably secured to the forward ends of bar 19 and slide 16, to open. At the same time, the end of bar 19 will engage a block 51, rotatably mounted on a pin 52 secured in a strap 53 fixed to gripping jaw 37 by a bolt 54, and swing jaw 37 away from jaw 32, thus putting the machine parts in position to receive a wire.

Stripping jaws 50 have been shown as having two angularly shaped notches in the face of each jaw so that, when the jaws are in wire stripping position, two rectangular openings will be formed which are surrounded by sharp cutting edges 55 adapted to cut through the insulation on a wire preparatory to stripping the insulation therefrom. These notches may be of any desired form but it is found that a semicircular notch does not work particularly well except upon one specified size of wire while an angularly shaped notch is adapted to handle wires of slightly varying diameters. It is also found that stripping jaws having two sizes of adjacently disposed cutting notches formed therein are the most convenient and, in order that either of the notches may be used, I provide a wire guide 56 which is slidably mounted on the front of base 10 in any suitable manner, as by being disposed behind a bent plate 57 and extending through suitable grooves formed in the inner faces of jaws 32 and 37.

Figure 4:
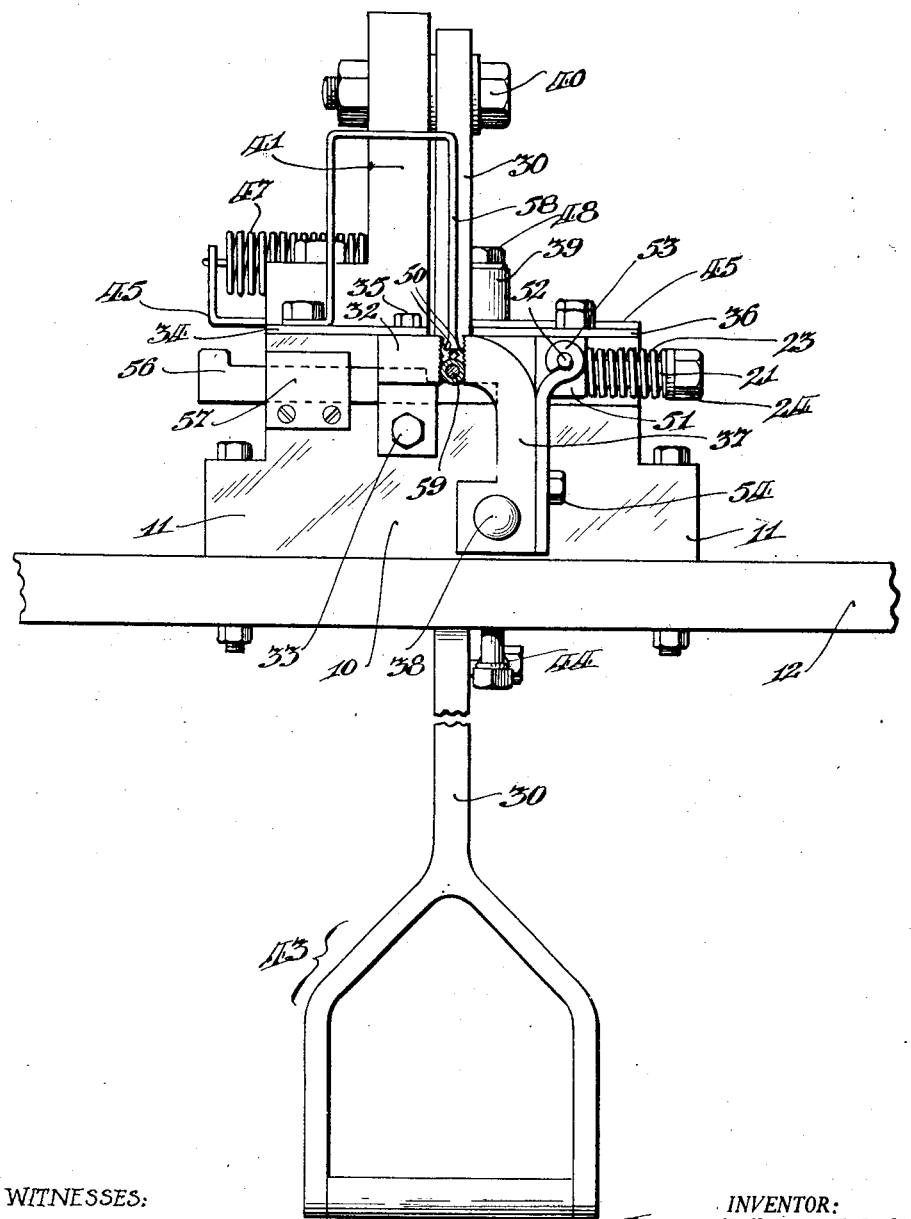

When the larger size of wire is to be stripped, wire guide 56 is placed in its outermost position, as shown in Figure 4, in which position its upper edge is approximately in the same plane as the bottoms of the larger cutting notches in stripping jaws 50. When a smaller wire is to be stripped, wire guide 56 is pushed inwardly until its wider portion is disposed directly in front of jaws 50 so that the wire will be guided between the smaller cutting notches.

In order to gauge the length of insulation to be stripped from the ends of the wires, I provide a gauge 58 which has been shown as consisting of a U-shaped piece of spring wire having one end secured to one of the bolts which holds cover plate 34 onto base 10 and having its other end, which is flattened, extending downwardly between slide 16 and bar 19 so that a wire inserted between the stripping jaws may abut this end, as shown in the drawings; the end of gauge 58 being swung rearwardly when the insulation is drawn from the wire and returning to its normal position due to its inherent elasticity. It is also evident that an adjustable stop may readily be attached to the inner face of slide 16 so that the stop would move rearwardly with the insulation being stripped from the wire.

Figure 2:
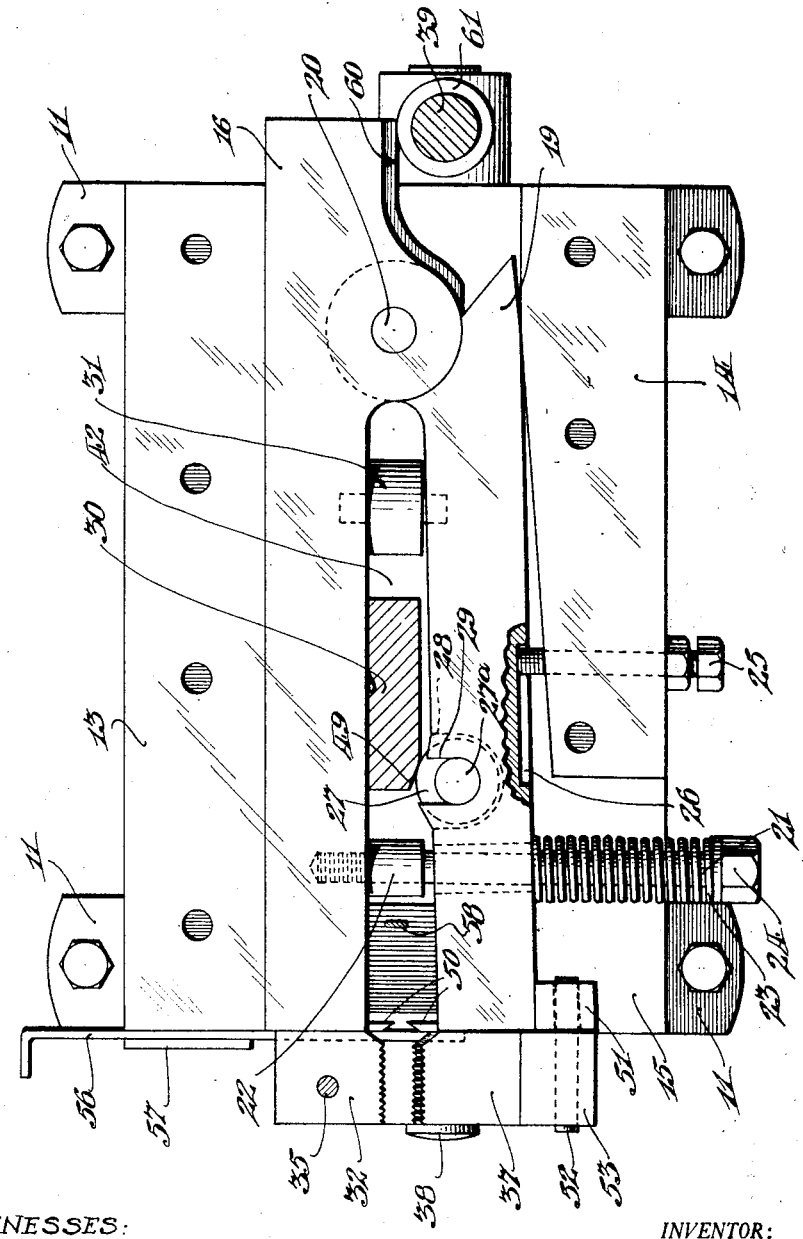
Figure 3:
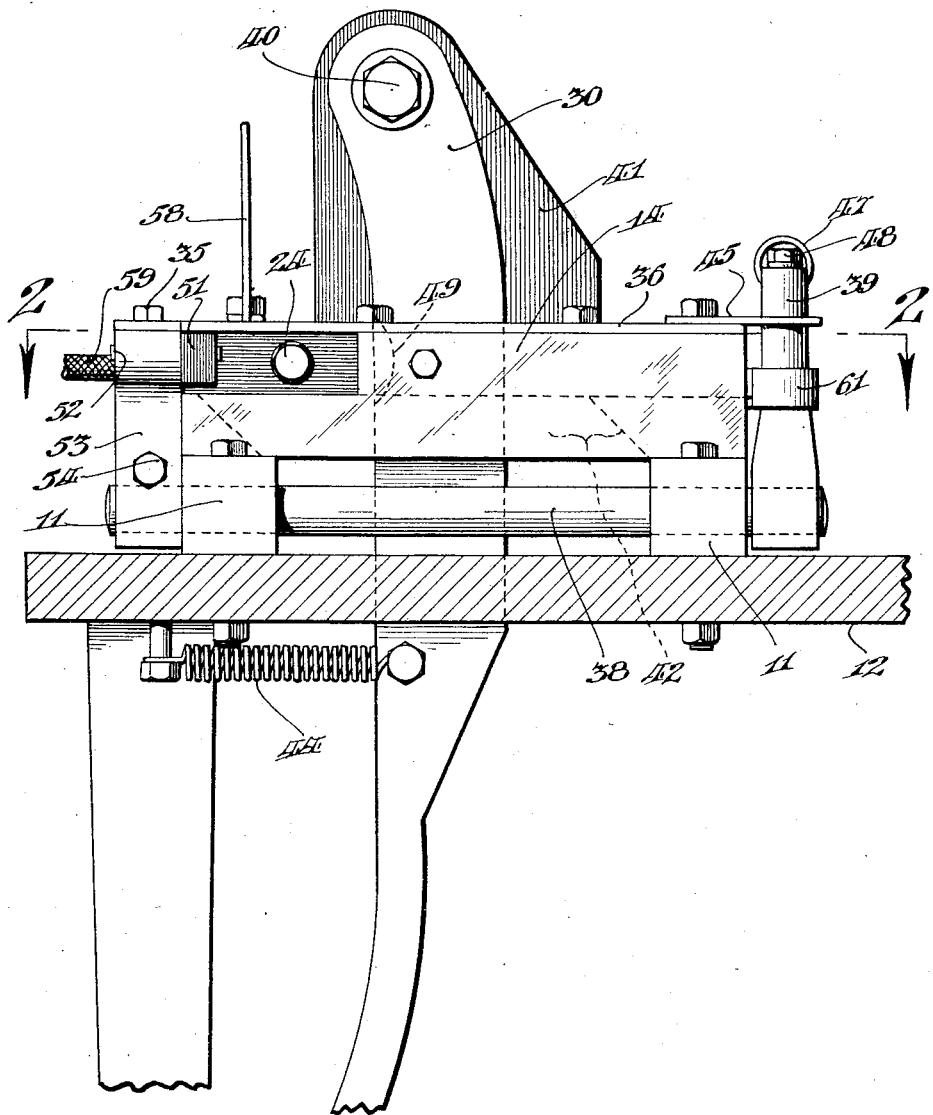
Figure 3 is a side view, looking from the right of the machine but drawn to a smaller scale and having the lower end of the operating lever broken away, and Figure 4 a front view, thereof, looking from the left of Figure 3.

Assuming now that the machine parts are in position to receive a wire, as shown in Figure 2, a wire 59 may be inserted into the machine until its end comes into contact with gauge 58. Treadle 43 may then be moved rearwardly so that beveled portion 49 on lever 30 is swung out of contact with roller 27, allowing spring 23 to move bar 19 against separator 22 and thus bring stripping jaws 50 into engagement with wire 59 and practically sever the insulation at this point, as well as allowing spring 47 to swing jaw 37 toward jaw 32 and cause wire 59 to be gripped therebetween, as shown in Figure 1.

If treadle 43 is swung rearwardly, the rear side of lever 30 will engage roller 31 and force slide 16 and bar 19 rearwardly and cause stripping jaws 50 to traverse the portion of wire extending into the machine and strip the insulation therefrom; the stripped portion of insulation falling downwardly through slot 42 and allowing gauge 58 to return to its normal position. As treadle 43 approaches the end of its rearward swing, a cam face 60 formed on the end of slide 16, engages a roller 61 rotatably mounted on spindle 39 and swings same outwardly, causing jaw 37 to move away from jaw 32 and releasing wire 59 so that same may be removed from the machine before stripping jaws 50 move forwardly.

Treadle 43 may then be allowed to return to its forward position, due to the action of spring 44, and this will cause lever 30 to contact with roller 27 and drag slide 16 and bar 19 forwardly; the tension of spring 23 being sufficient to prevent beveled portion 49 from riding upon roller 27 and opening jaws 50. As soon as the forward end of slide 16 contacts with jaw 32, however, lever 30 will continue its forward movement so that beveled portion 49 will ride upon roller 27 and swing bar 19 outwardly, thus opening both the stripping jaws and gripping jaws as previously explained.

It has been found in actual use that the only attention required by this machine is periodic lubrication and occasional sharpening of the stripping jaws as the machine is so simply and sturdily built that there is nothing to get out of order and it is so simple in operation that a totally inexperienced person may operate it.

While I have illustrated and described a certain embodiment of my invention, it is readily understood that modifications may be made without departing from the spirit thereof, and hence I do not wish to limit myself to the construction set forth but consider that I am at liberty to make such changes and alterations as fairly come within the scope of the appended claims.

I claim:

1. A stripping machine including a base, a fixed gripping jaw, a rockable gripping jaw, means tending to hold said jaws together, stripping elements slidable on the base, means for moving a part of the gripping elements and a part of the stripping elements relative to their other parts, and means for moving the stripping elements relative to the gripping elements.

2. A stripping machine including a fixed gripping jaw, a rockable gripping jaw, means tending to hold said jaws together, a slidable stripping element, a swingable stripping element hinged to the slidable stripping element, means tending to move said elements toward each other, means for moving said elements relatively to the jaws, and means for opening the jaws and separating the stripping elements.

3. A wire stripping machine including a base, gripping jaws on the base for holding an insulated wire against movement, stripping elements reciprocable on the base, a lever adapted to move the stripping elements on the base, means on a stripping element for opening the gripping jaws, and means on the stripping element adapted to co-act with the lever for separating the ends of said stripping elements.

4. A wire stripping machine including a pair of gripping jaws, a spring tending to hold the jaws closed, a pair of reciprocable stripping elements, a spring tending to hold the elements together, means co-acting with the stripping elements for separating said elements and opening the jaws to receive a wire, means for reciprocating the stripping elements for stripping a wire, and means for opening the jaws when the stripping elements are in their rearmost position.

5. A wire stripping machine including a base, shoulders on the base, stripping elements reciprocable between the shoulders, gripping jaws on the base, a bracket on one shoulder, a lever hinged to the bracket, means on a stripping element adapted to be engaged by the lever for separating the stripping elements, means on a jaw adapted to be engaged by a stripping element for opening the jaws, means on the stripping elements adapted to be engaged by the lever for reciprocating same, a cam face on a stripping element, and means engaged by said cam face for opening the gripping jaws.

6. A wire stripping machine including a base, shoulders on the base, gripping jaws on the base, a spring tending to hold the jaws together, stripping elements slidable on the base between the shoulders, cover plates secured to the shoulders, a bracket on a cover plate, a spring tending to hold the stripping elements together, a lever hinged to the bracket, a roller in a stripping element adapted to be engaged by the lever for separating the stripping elements and for sliding said elements forwardly, a block on a gripping jaw adapted to be engaged by a stripping element when in its forwardmost position for opening the jaws, a roller mounted in the stripping elements and adapted to be engaged by the lever for sliding said elements rearwardly, a cam face on a stripping element, and means adapted to be engaged by said cam face for opening the jaws when the stripping elements are in their rearmost position.

7. In a wire stripping machine having a base with a groove therein, stripping elements including a slide reciprocable on the base, a guide on the slide engaging the groove, a bar hinged to the slide, stripping jaws on the slide and bar, and means tending to swing the bar towards the slide.

8. In a wire stripping machine having a base with a groove therein, stripping elements including a slide reciprocable on the base, a guide on the slide engaging the groove, a bar hinged to the slide, stripping jaws on the slide and bar, a separator between the slide and the bar, a bolt slidable in the bar and separator and fixed in the slide, and a spring between the bar and the head of the bolt.

9. In a wire stripping machine having a base, a pair of stripping elements reciprocable on the base and hinged to one another, and a lever oscillatable in the base; means for separating the ends of the stripping elements including a contact on one of the elements, and a contact surface on the lever adapted to engage said contact.

10. In a wire stripping machine having a base, a pair of stripping elements reciprocable on the base, and a lever oscillatable in the base; means for separating the ends of the stripping elements including a roller in one of the elements, and a beveled part on the lever adapted to engage said roller.

11. In a wire stripping machine having a base and a pair of stripping elements reciprocable on the base, means for reciprocating said pair of elements including a lever oscillatable in the base, a contact between the elements at one side of the lever, a contact on one of the elements at the other side of said lever, and means for oscillating the lever.

12. In a wire stripping machine having a base and a pair of stripping elements reciprocable on the base, means for reciprocating said elements including a lever oscillatable in the base, a roller having its shaft mounted in each of the elements and rotatable between said elements at one side of the lever, a roller rotatable in one of the elements at the other side of the lever, and means for oscillating the lever.

13. In a wire stripping machine having a base and stripping elements reciprocable thereon, wire holding means including a jaw fixed on the base, a jaw hinged on the base, resilient means tending to hold the hinged jaw against the fixed jaw, and means coacting with the stripping elements for rocking the hinged jaw.

14. In a wire stripping machine having a base and stripping elements reciprocable thereon, wire holding means including a jaw fixed on the base, a shaft rockable in the base, a rockable jaw fixed to the shaft, resilient means tending to hold the rockable jaw against the fixed jaw, and a contact on the rockable jaw adapted to be engaged by a stripping element for opening the jaws.

15. In a wire stripping machine having a base and stripping elements reciprocable thereon, wire holding means including a jaw fixed on the base, a shaft rockable in the base, a rockable jaw fixed to the shaft, an arm fixed to the shaft, resilient means tending to hold the rockable jaw against the fixed jaw, and a cam face on a stripping element adapted to engage the arm and rock the shaft.

16. In a wire stripping machine having a base and stripping elements reciprocable thereon, wire holding means including a jaw fixed on the base, a shaft rockable in the base, a rockable jaw fixed on the shaft, a spindle fixed on the shaft, a roller on the spindle, a spring fixed to the spindle and to the base tending to hold the rockable jaw against the fixed jaw, a cam face on a stripping element adapted to engage the roller and open the jaws when said element is near its rearmost position, and a contact on the rockable jaw adapted to be engaged by a stripping element when said element is in its forward position for swinging the rockable jaw.

In testimony whereof I have signed my name to this specification.

JESSEE MERCER WHITE.